United States Patent
Bojovschi et al.

(10) Patent No.: US 11,195,132 B2
(45) Date of Patent: Dec. 7, 2021

(54) SYSTEM, METHOD AND COMPUTER PROGRAM PRODUCT FOR CHARACTERIZING OBJECT STATUS AND DETERMINING A MAINTENANCE SCHEDULE

(71) Applicant: International Business Machines Corporation, Armonk, NY (US)

(72) Inventors: Alexe Bojovschi, Lilydale (AU); Laura Irina Rusu, Endeavour Hills (AU); John Michael Wagner, Carlton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 719 days.

(21) Appl. No.: 15/338,703

(22) Filed: Oct. 31, 2016

(65) Prior Publication Data
US 2018/0121845 A1    May 3, 2018

(51) Int. Cl.
*G06Q 10/06* (2012.01)
*G06Q 10/10* (2012.01)
*G06Q 10/00* (2012.01)

(52) U.S. Cl.
CPC ..... *G06Q 10/0635* (2013.01); *G06Q 10/1097* (2013.01); *G06Q 10/20* (2013.01)

(58) Field of Classification Search
None
See application file for complete search history.

(56) References Cited

U.S. PATENT DOCUMENTS

| | | | |
|---|---|---|---|
| 2005/0007450 A1 | 1/2005 | Hill et al. | |
| 2008/0100614 A1* | 5/2008 | Augst | G06T 19/006 345/419 |
| 2010/0215212 A1 | 8/2010 | Flakes, Jr. | |
| 2012/0072723 A1* | 3/2012 | Orsini | H04L 63/10 713/165 |
| 2012/0194644 A1* | 8/2012 | Newcombe | G06T 7/20 348/46 |
| 2013/0304532 A1* | 11/2013 | Cormier | G06Q 10/06 705/7.15 |

(Continued)

FOREIGN PATENT DOCUMENTS

CN    101025804 B  *  7/2012  ......... G05B 23/0283

OTHER PUBLICATIONS

Daftry et al. Introspective Perception: Learning to Predict Failures in Vision Systems. IEEE/RSJ International Conference on Intelligent Robots and Systems (IROS 2016). Published on Jul. 28, 2016. (Year: 2016).*

(Continued)

*Primary Examiner* — Patricia H Munson
*Assistant Examiner* — Nancy N Prasad
(74) *Attorney, Agent, or Firm* — Joseph Petrokaitis, Esq.; McGinn I.P. Law Group, PLLC.

(57) ABSTRACT

A maintenance prioritization method, system, and computer program product, include collecting information including image data and status data for a plurality of objects of interest, building a three-dimensional image for each object, and estimating a risk factor of failure for each object by analyzing the information and the three-dimensional image of the object to compare with known characteristics of the object and a reference object description.

17 Claims, 4 Drawing Sheets

(56) References Cited

U.S. PATENT DOCUMENTS

| | | |
|---|---|---|
| 2014/0168420 A1 | 6/2014 | Naderhirn et al. |
| 2015/0210388 A1 | 7/2015 | Criado et al. |
| 2015/0304612 A1 | 10/2015 | Richards et al. |
| 2016/0017866 A1 | 1/2016 | Craft et al. |
| 2017/0052150 A1* | 2/2017 | Zalameda .......... G01N 21/8803 |

OTHER PUBLICATIONS

Young et al. An Efficient Approach to Converting Three-Dimensional Image Data into Highly Accurate Computational Models. Philosophical Transactions of the Royal Society. http://doi.org/10.1098/rsta.2008.0090. The Royal Society Publishing. Date: Jun. 23, 2008. (Year: 2008).*

Mel, et al. "The NIST Definition of Cloud Computing". Recommendations of the National Institute of Standards and Technology. Nov. 16, 2015.

Deng, Chuang, et al. "Unmanned Aerial Vehicles for Power Line Inspection—A Cooperative Way in Platforms and Communications". Journal of Communications vol. 9, No. 9, Sep. 2014. p. 687-692.

Perry, Clay C., et al. "EPRI Tests Confirm Viability of Using Drones to Assess Storm Damage on Distribution Systems". EPRI | Electric Power Research Institute. Apr. 4, 2012.

"Industrial & Civil Infrastructure Inspection". Ascending Technologies GmbH. Jun. 3, 2015.

Phillips, A. "Future Inspection of Overhead Transmission Lines 1016921". EPRI | Electric Power Research Institute. May 2998.

\* cited by examiner

MAINTENANCE PRIORITIZATION METHOD 100

SYSTEM, METHOD AND COMPUTER PROGRAM PRODUCT FOR CHARACTERIZING OBJECT STATUS AND DETERMINING A MAINTENANCE SCHEDULE

BACKGROUND

The present invention relates generally to a maintenance prioritization method, and more particularly, but not by way of limitation, to a system, method, and computer program product for performing image processing and data analytics to extract different characteristics of an object to optimize a cost required to characterize the objects and prioritize their maintenance.

The transformation of systems such as electrical grids, railways and road networks, pipelines, and buildings (i.e., infrastructure) over the next decades will require a higher level of reliability and streamlined maintenance than required today. This will require that the maintenance and operation of these systems be highly automated and that the industries will move from a reactive to a proactive operation to prevent system failure.

Image data collected from viewing an object or a system conventionally includes two-dimensional information that is only from one or two angles. Such does not capture surface/object characteristics that are hidden due to their complex three-dimensional structure (e.g., sheds of high voltage insulators) and that could be used to characterize the objects more accurately to help prioritize their maintenance.

Further, diverse factors such as mechanical, thermal, electrical and environmental stresses contribute to the degradation of different components in a complex system which leads to component and/or system failure. Some factors contributing to the recent increase in the number of power losses are the aging of the high voltage insulators and the increase in environmental pollutants. This process is accelerated by the increased power overload required to support new appliances.

SUMMARY

In an exemplary embodiment, the present invention can provide a computer-implemented maintenance prioritization method, the method including collecting information including image data and status data for a plurality of objects of interest, building a three-dimensional image for each object, and estimating a risk factor of failure for each object by analyzing the information and the three-dimensional image of the object to compare with known characteristics of the object and a reference object description.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
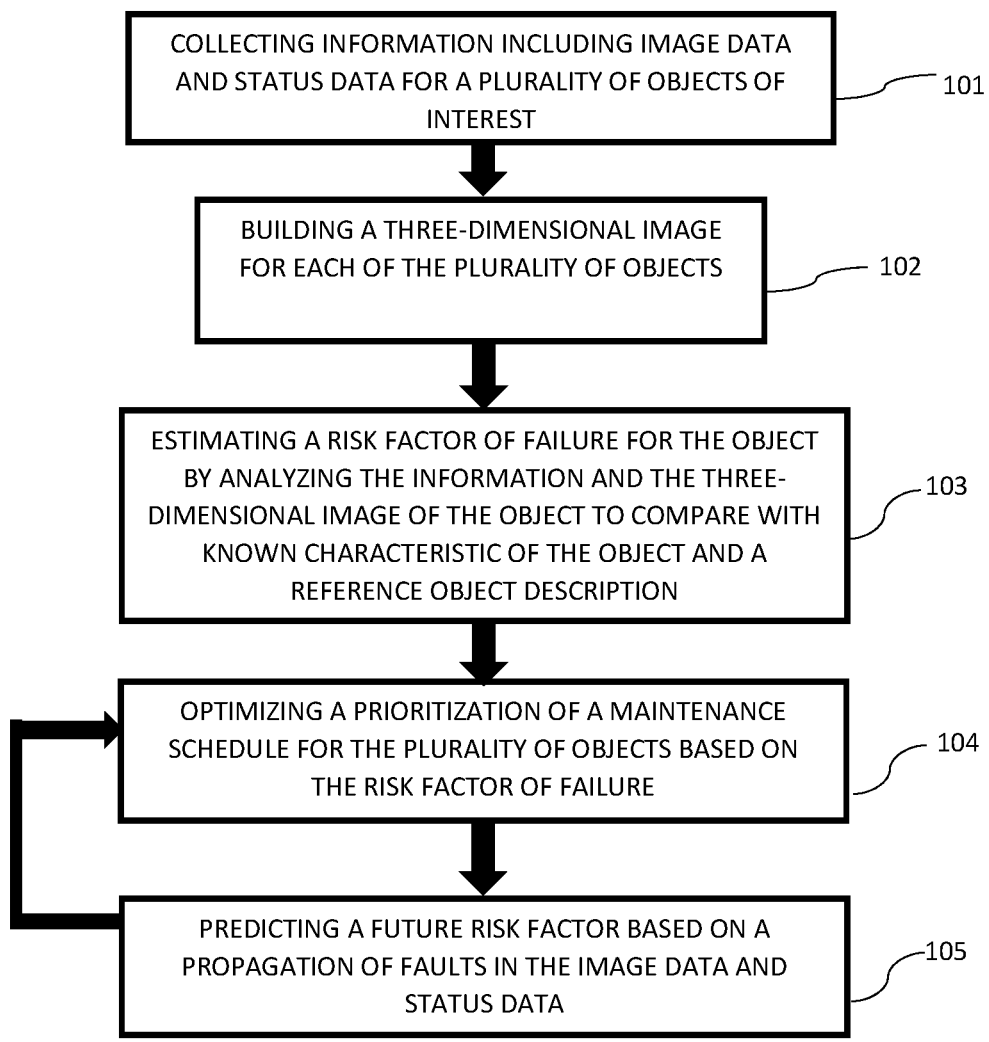
FIG. 1 exemplarily shows a high-level flow chart for a maintenance prioritization method 100.

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the maintenance prioritization method 100 includes various steps to prevent (e.g., lessen) failure of objects (e.g., insulators in the power network that lead to an imminent blackout, train rails on train tracks, etc.) by image and data analytics of a generated three-dimensional object. As shown in at least FIG. 2, one or more computers of a computer system 12 according to an embodiment of the present invention can include a memory 28 having instructions stored in a storage system to perform the steps of FIG. 1.

Thus, the maintenance prioritization method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

In step 101, information including image data and status data is collected for a plurality of objects of interest. The image data represents visual data, in the visible, infra-red or ultraviolet spectrum or a combination thereof, of the objects of interest. The status data is obtained from electromagnetic, temperature, thermal, chemical, level surface topography, and ultrasonic sensors or a combination thereof. In other words, image data is collected to pictorially represent the objects and status data is collected to depict potential underlying faults or trouble spots with the system such as an electrical overload, chemical issue, rust, etc.

In step 102, a three-dimensional image (3D model) is built for each of the plurality of objects based on the information in step 101. The three-dimensional image is a temporal representation of the structure and surface properties of each of the objects of interest.

In step 103, a risk factor of failure for the object is estimated by analyzing the information and the three-dimensional image of the object to compare with known characteristics of the object and a reference object description. The three-dimensional image may be analyzed to extract features that are indicators of different degrees of fault and the three-dimensional image is corroborated with the status data. The known characteristics of the object include knowledge obtained from a similar object exposed to similar environments (e.g., for which historical data is available) to derive estimates of the probability of failure. The reference object description includes characteristics of a virgin object (e.g., a similar or an identical object but that was not exposed to external stresses such as electrical, electromagnetic, chemical, etc.). Thereby, the risk factor of failure is based on the knowledge of the object such as expected life time and characteristics rating for specific stresses (e.g., voltage rating, chemical rating, etc.).

In other words, in step 103, known characteristics of the objects and reference objects descriptions or prior object knowledge are compared to the three-dimensional image and the status data to estimate the risk factor of failure.

In step 104, a prioritization of a maintenance schedule is optimized for the plurality of objects based on the risk factor of failure estimated in step 103. That is, the risk factor of failure is used to develop prioritization strategies for the maintenance teams. For example, objects with a highest risk factor of failure are prioritized for maintenance over those objects with a low risk factor of failure. In this manner, objects can be optimally maintained to save costs associated with object failure and outages (e.g., a train rail failing, a transistor failing and causing power outages, etc.) while balancing unnecessary early maintenance which also increases costs.

In step 104, the maintenance schedule can be dynamically updated on a cloud platform and readily accessible on mobile devices. In some embodiments, the maintenance schedule can be conveyed to human agents to perform the maintenance or to autonomous robotic systems capable for performing the maintenance.

Further, in step 104, detailed maintenance actions and descriptions of the faulty objects can be generated with the maintenance schedule. The maintenance actions can include, for example, service (e.g., surface cleaning, surface treatment, patching, etc.), replacement, etc. Also, the descriptions of the faulty objects can include aspects of the objects such as cracks, tears, punctures and surface aging as well as electromagnetic or sound waves that can indicate both surface and internal faults of objects (e.g. surface and internal partial discharge in high voltage insulators).

In some embodiments, machine learning techniques can generate guidance to allocate resources for the maintenance schedule, approaches and strategies to optimize and improve the performance and reliability of the power network, etc.

In step 105, a future risk factor for an object is predicted based on a propagation of faults in the image data and status data. In other words, step 105 analyzes and compares the three-dimensional image and status data of an object with past images, status data, known characteristics of the object, and a reference object description to predict how the risk factor will change over time (e.g., a future risk factor) such that step 104 can prioritize the maintenance schedule based on the future risk factor. The prediction uses expected stress values, decay rates, expected lifetimes to compare with the current conditions, and the propagation of the conditions over time to predict the future risk factor.

That is, a first object could have a current risk factor equal to a risk factor of a second object but the status data and three-dimensional image comparison indicates that the risk factor for the first object will increase far quicker than the risk factor of the second object because of, for example, the external chemical conditions causing rust to build up. Therefore, high risk objects are able to be identified (and remedial action taken) by predicting a future risk factor.

Thereby, steps 101-105 can prevent (e.g., limit) failure of objects (e.g. insulators in the power network that lead to an imminent blackout) by detailed image and data analytics of 3D objects, provide a characterization of small crevices and areas of objects that are not accessible with the current methods and represent incipient signs of failure (e.g., via the three-dimensional image), and build a temporal representation of three-dimensional object structural dynamics and surface properties and use it for predicting their future states with the aid of predictive or modeling techniques.

In some embodiments, an accelerated machine learning can be used by employing multiple learning stages to improve the speed and accuracy of predicting the risk factor of failure for the objects. For example, in steps 101-105, scores having a strongest connection with the failure rate of objects can be determined and a list of the objects can be sorted by the score most associated with the past failures of that type of object. The list can be divided into two sub-lists in which the method 100 can find the score having strongest association with the past failure rate in each sub-list. Alternatively, the list can be divided into three sub-lists.

In some embodiments steps 103-105 can include a predictive regression model that can be implemented based on the locally weighted regression. The model can represent a dependence on the state variable of objects and the external driving parameters under normal conditions. The regression model, obtained from normal condition training data, can be used to predict expected values for state variables of objects and derive deviation from these values under abnormal conditions. Secondly, the deviation from the normal condition is estimated. The method can discriminate whether the variations in the state variables of objects are influenced by faults or external driving conditions.

The model can include a fault detection stage (e.g., in step 103). During step 103, a vector (i.e., $X=[x1,x2, \ldots, xn]$) can store sample values or external state variables from "n" sensors located in the proximity of an insulator. These state variables of object can be, for example, electromagnetic field associated with, audio signals, image data or chemical data. External driving variables can be stored in a vector (i.e., $Y=[y1,y2, \ldots, yn]$). The external variables can be, for example power load, environmental pollution level and weather parameters. The detection of fault can be performed using a model f that relates the state conditions $<X>$ of insulator and the driving variables Y where $<X>=f(Y)$. This allows to determine faults by comparing actual values X with expected values $<X>=f(Y)$ for the external conditions x, and reporting a fault when the value exceeds a predicted (predetermined) threshold. An analytical or computational model of the i_object with state variables and associated or possible weather condition can be integrated to improve the fault estimation and improve the prediction of its severity.

The model can further include the risk factor of fault classification. The degree of fault of object can be classified to improve prioritization of the maintenance (e.g., step 104). In some embodiments, the classification can be based on a difference between the deviation from the normal conditions (dX=X−<X>) and not only on the sensing data. This involves the assumption that occurrence of an object fault is largely independent of the external conditions. In line with this assumption, the training data can be collected from faulty equipment caused by a large number of external conditions Y as long as the model f distinguishes correctly X from Y.

The method 100 can rely on a model construction. During model construction, the regression step determines the function f(Y) to ensure that an objective or cost function (e.g. mean square error) which measure the accuracy of the fit, is optimized.

The method can include a classifier training (e.g., step 105). This step allows for generating prediction residuals based on the regression model and measured values of insulator state variables. A final state would provide fault detection, diagnosis and predictions. After the construction of the training model the feature state variables are predicted and new sensing data and/or simulation results used to improve the model.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
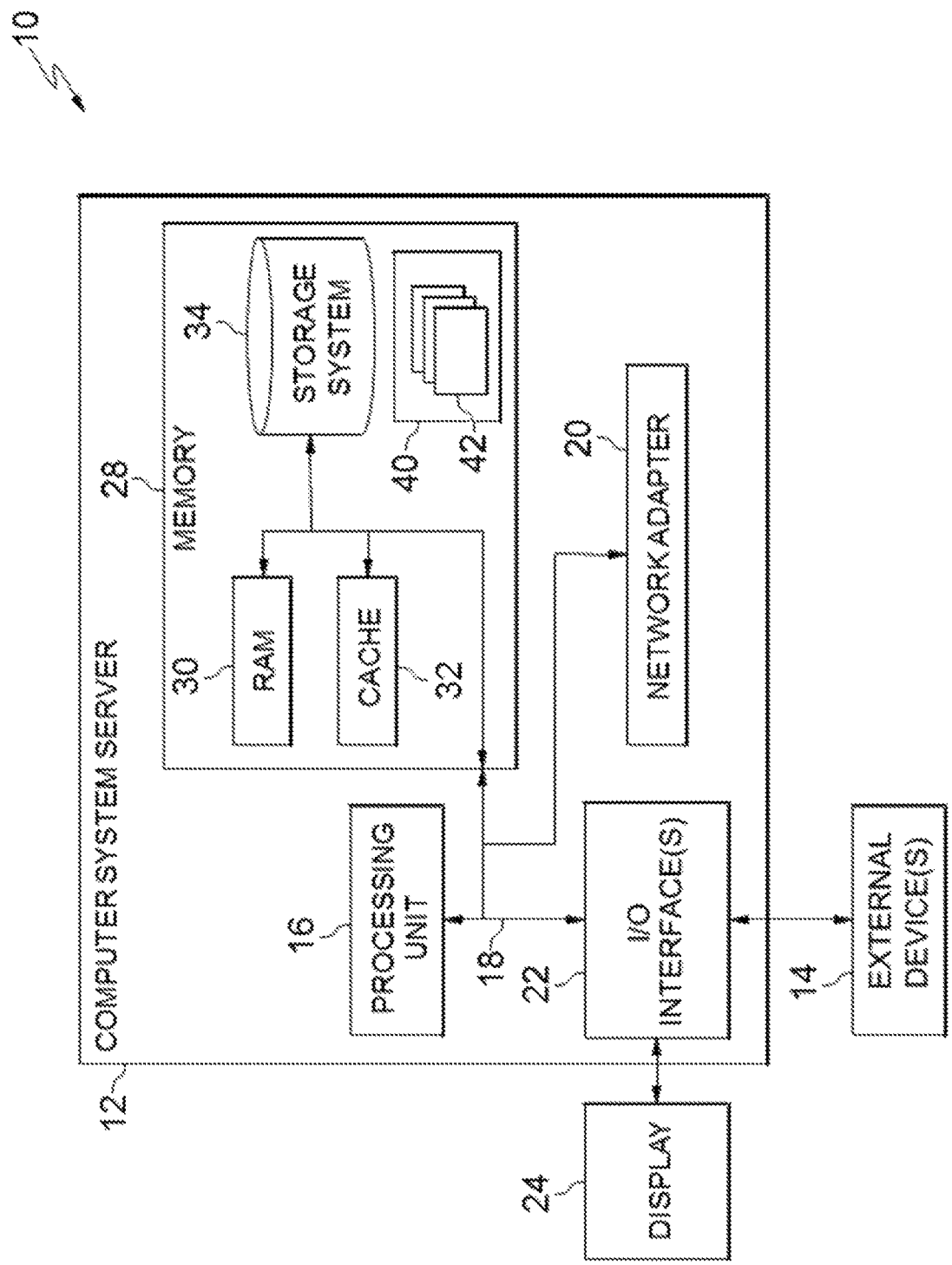
FIG. 2 depicts a cloud computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
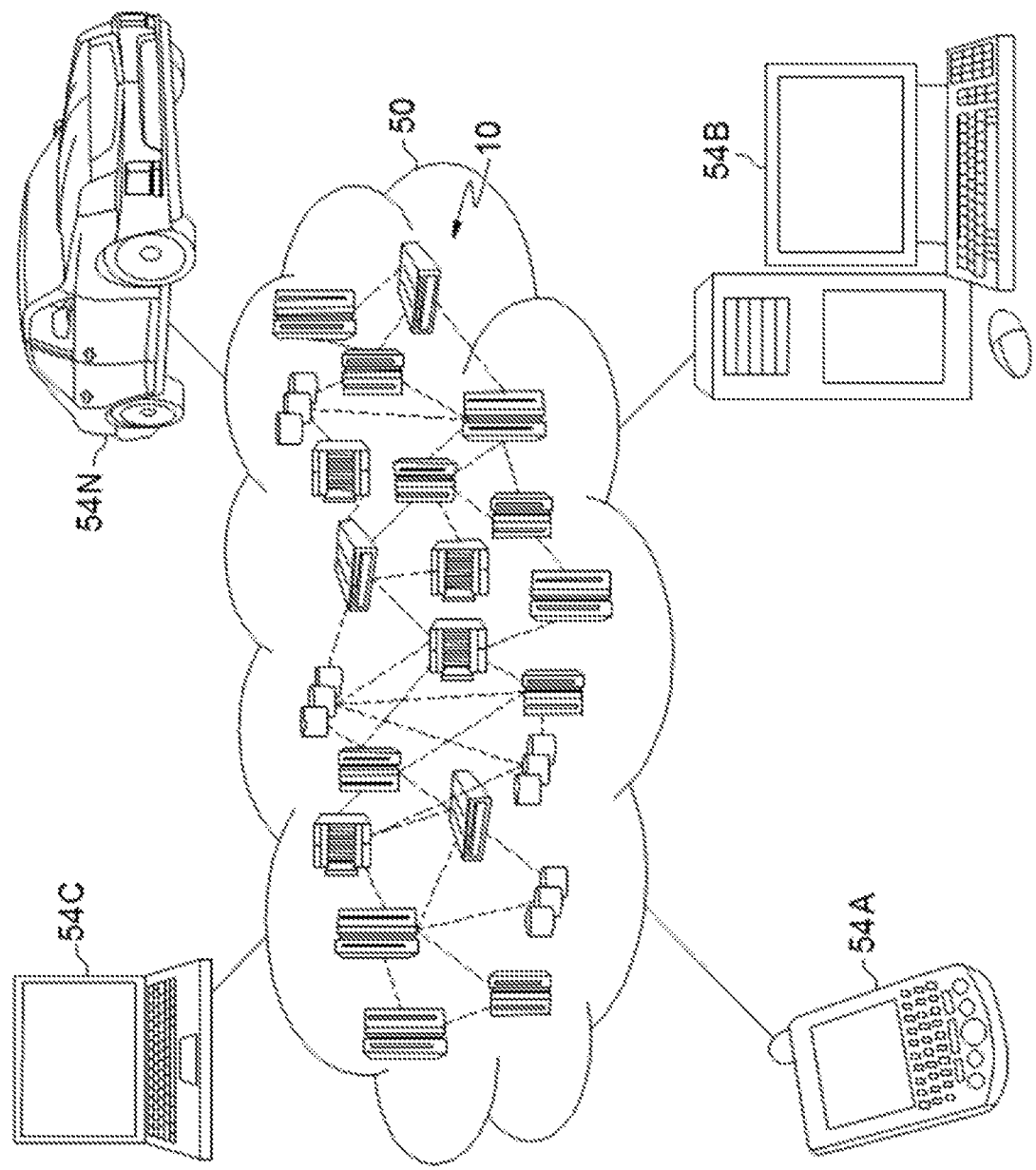
FIG. 3 depicts a cloud computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
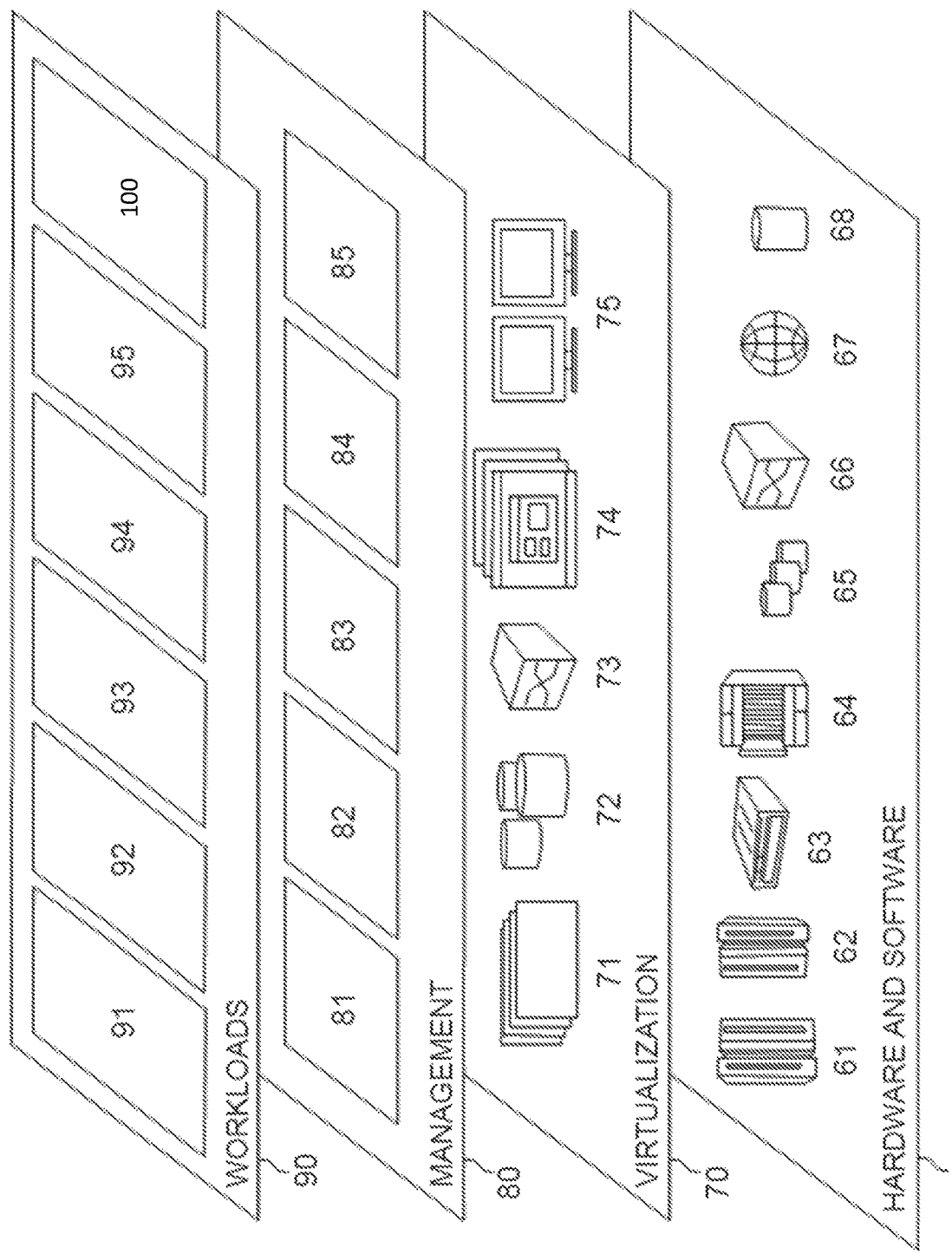
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the maintenance prioritization method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented maintenance prioritization method, the method comprising:
    collecting, via vehicle-mounted sensors, information including:
        image data for a plurality of objects of interest, the image data pictorially representing the object; and
        status data for the plurality of objects of interest, the status data depicting an underlying fault;
    building a three-dimensional image for each object, the three-dimensional image being a temporal representation of three-dimensional object structural dynamics and surface properties of each of the objects of interest;
    estimating a risk factor of failure for each object by analyzing the information and the three-dimensional image of the object to compare with temporal representations of known characteristics of the same object and a reference object description, the analyzing including analyzing the three-dimensional image to extract features that are indicators of different degrees of fault and the three-dimensional image is corroborated with the status data, wherein the known characteristics of the object include knowledge obtained from a similar object exposed to similar environments for which historical data is available to derive estimates of a probability of failure, wherein the reference object description includes characteristics of a similar or an identical object that was not exposed to external stresses;
    predicting a future risk factor based on a propagation of faults in the image data and the status data for an object of the plurality of objects; and
    creating a maintenance schedule based on the risk factor of failure for each object and the future risk factor, objects with a highest risk factor of failure and a highest future risk factor being prioritized for maintenance in the maintenance schedule over objects with a lower risk factor of failure and a lower future risk factor, the creating using machine learning to generate guidance to allocate resources for the maintenance schedule,
    wherein one or more network interfaces pass data from/to the vehicle-mounted sensors to/frog computers, and
    wherein one or more databases in the computer system store the dynamic object model of a physical system, the dynamic object model receiving real-time information through the interfaces from the sensors.

2. The computer-implemented method of claim 1, further comprising optimizing a prioritization of the maintenance schedule for the plurality of objects based on the risk factor of failure,
    wherein the dynamic model uses the real-time information to determine changes in status of the physical systems.

3. The computer-implemented method of claim 1, wherein the image data represents visual data in at least one of a visible spectrum, an infrared spectrum, and an ultraviolet spectrum of the plurality of objects of interest.

4. The computer-implemented method of claim 1, wherein the status data comprises at least one of electromagnetic data, thermal data, chemical data, surface topography data, and ultrasonic data for each of the plurality of objects.

5. The computer-implemented method of claim 2, wherein the optimized maintenance schedule is dynamically updated for access via a mobile device.

6. The computer-implemented method of claim 1, wherein the predicting bases the future risk factor on a plurality of conditions of the object at different times compared with an expected stress value, a decay rate, and expected lifetime of the object to determine a propagation of the conditions over the different times to predict the future risk factor.

7. The computer-implemented method of claim 2, wherein the maintenance schedule includes a description of a rationale of the risk factor of failure including an area of the object that requires maintenance.

8. The computer-implemented method of claim 1, embodied in a cloud-computing environment.

9. The computer-implemented method of claim 3, wherein the optimized maintenance schedule is dynamically updated for access via a mobile device.

10. The computer-implemented method of claim 4, wherein the optimized maintenance schedule is dynamically updated for access via a mobile device.

11. The computer-implemented method of claim 8, wherein the cloud computing environment comprises a cloud computing model of a service delivery comprising two or more clouds of a private cloud, a community cloud, and a public cloud that remain unique entities but are bound together by technology that enables data and application portability that results in load-balancing between the two or more clouds.

12. A computer program product for maintenance prioritization, the computer program product comprising a computer-readable storage medium having program instructions embodied therewith, the program instructions executable by a computer to cause the computer to perform:
   collecting, via vehicle-mounted sensors, information including:
      image data for a plurality of objects of interest, the image data pictorially representing the object; and
      status data for the plurality of objects of interest, the status data depicting an underlying fault;
   building a three-dimensional image for each object, the three-dimensional image being a temporal representation of three-dimensional object structural dynamics and surface properties of each of the objects of interest;
   estimating a risk factor of failure for each object by analyzing the information and the three-dimensional image of the object to compare with temporal representations of known characteristics of the same object and a reference object description, the analyzing including analyzing the three-dimensional image to extract features that are indicators of different degrees of fault and the three-dimensional image is corroborated with the status data, wherein the known characteristics of the object include knowledge obtained from a similar object exposed to similar environments for which historical data is available to derive estimates of a probability of failure, wherein the reference object description includes characteristics of a similar or an identical object that was not exposed to external stresses;
   predicting a future risk factor based on a propagation of faults in the image data and the status data for an object of the plurality of objects; and
   creating a maintenance schedule based on the risk factor of failure for each object and the future risk factor, objects with a highest risk factor of failure and a highest future risk factor being prioritized for maintenance in the maintenance schedule over objects with a lower risk factor of failure and a lower future risk factor, the creating using machine learning to generate guidance to allocate resources for the maintenance schedule,
   wherein one or more network interfaces pass data from/to the vehicle-mounted sensors to/from computers, and
   wherein one or more databases in the computer system store the dynamic object model of a physical system, the dynamic object model receiving real-time information through the interfaces from the sensors.

13. The computer program product claim 12, further comprising optimizing a prioritization of the maintenance schedule for the plurality of objects based on the risk factor of failure,
   wherein the dynamic model uses the real-time information to determine changes in status of the physical systems.

14. The computer program product claim 12, wherein the image data represents visual data in at least one of a visible spectrum, an infrared spectrum, and an ultraviolet spectrum of the plurality of objects of interest.

15. The computer program product claim 12, wherein the status data comprises at least one of electromagnetic data, thermal data, chemical data, surface topography data, and ultrasonic data for each of the plurality of objects.

16. A maintenance prioritization system, said system comprising:
   a processor; and
   a memory, the memory storing instructions to cause the processor to perform:
      collecting, via vehicle-mounted sensors, information including:
         image data for a plurality of objects of interest, the image data pictorially representing the object; and
         status data for the plurality of objects of interest, the status data depicting an underlying fault;
      building a three-dimensional image for each object, the three-dimensional image being a temporal representation of three-dimensional object structural dynamics and surface properties of each of the objects of interest;
      estimating a risk factor of failure for each object by analyzing the information and the three-dimensional image of the object to compare with temporal representations of known characteristics of the same object and a reference object description, the analyzing including analyzing the three-dimensional image to extract features that are indicators of different degrees of fault and the three-dimensional image is corroborated with the status data, wherein the known characteristics of the object include knowledge obtained from a similar object exposed to similar environments for which historical data is available to derive estimates of a probability of failure, wherein the reference object description includes characteristics of a similar or an identical object that was not exposed to external stresses;
      predicting a future risk factor based on a propagation of faults in the image data and the status data for an object of the plurality of objects; and
      creating a maintenance schedule based on the risk factor of failure for each object and the future risk factor, objects with a highest risk factor of failure and a highest future risk factor being prioritized for maintenance in the maintenance schedule over objects with a lower risk factor of failure and a lower future risk factor, the creating using machine learning to generate guidance to allocate resources for the maintenance schedule,
   wherein one or more network interfaces pass data from/to the vehicle-mounted sensors to/from computers, and
   wherein one or more databases in the computer system store the dynamic object model of a physical system, the dynamic object model receiving real-time information through the interfaces from the sensors.

17. The system of claim 16, embodied in a cloud-computing environment.

* * * * *